United States Patent [19]
Chronister

[11] Patent Number: 5,931,444
[45] Date of Patent: Aug. 3, 1999

[54] INTERNAL TANK CAR VALVE WITH SAFETY LOCK

[76] Inventor: Clyde H. Chronister, 6830 Champions Plaza Dr. #733, Houston, Tex. 77069

[21] Appl. No.: 09/026,707

[22] Filed: Feb. 20, 1998

[51] Int. Cl.[6] ...................................................... F16K 3/36
[52] U.S. Cl. .......................... 251/111; 251/144; 251/248; 251/294; 137/797
[58] Field of Search .................... 251/144, 112, 251/294, 248, 111; 137/797

[56] References Cited

U.S. PATENT DOCUMENTS

| | | | |
|---|---|---|---|
| 865,915 | 9/1907 | Koch | 251/112 |
| 1,491,077 | 4/1924 | Beerworth | 251/293 |
| 1,609,879 | 12/1926 | Messmer | 251/263 |
| 1,779,750 | 10/1930 | Oldham | 251/86 |
| 2,045,758 | 6/1936 | Crossen, Jr. | 251/294 |
| 2,109,870 | 3/1938 | Thwaits | 251/294 |
| 2,384,787 | 9/1945 | Baker et al. | 137/139 |
| 2,470,700 | 5/1949 | Henry | 251/46 |
| 2,848,187 | 8/1958 | Henry | 251/85 |
| 3,065,950 | 11/1962 | Goldberg | 251/160 |
| 3,182,951 | 5/1965 | Spencer | 251/85 |
| 3,447,777 | 6/1969 | Carlson | 251/294 |
| 3,531,083 | 9/1970 | Rohrer | 251/188 |
| 3,656,710 | 4/1972 | Shaw | 251/144 |
| 3,955,792 | 5/1976 | Cho | 251/294 |
| 3,963,211 | 6/1976 | Myers | 251/85 |
| 3,981,481 | 9/1976 | Reedy et al. | 251/144 |
| 4,073,469 | 2/1978 | Kodric | 251/86 |
| 4,121,614 | 10/1978 | Reedy | 137/382.5 |
| 4,137,935 | 2/1979 | Snowdon | 137/242 |
| 4,161,958 | 7/1979 | Behle | 137/316 |
| 4,180,242 | 12/1979 | Reedy | 251/144 |
| 4,194,523 | 3/1980 | Lubieniecki | 137/238 |
| 4,220,097 | 9/1980 | Wempe et al. | 105/360 |
| 4,280,679 | 7/1981 | Shaw | 251/144 |
| 4,408,627 | 10/1983 | Harris | 137/242 |
| 4,440,379 | 4/1984 | Behle et al. | 251/144 |
| 4,586,538 | 5/1986 | Niskanen | 137/625.5 |
| 5,042,776 | 8/1991 | Chronister | 251/144 |
| 5,145,151 | 9/1992 | Chronister | 251/144 |
| 5,170,988 | 12/1992 | Chronister | 251/144 |
| 5,209,456 | 5/1993 | Chronister | 251/144 |
| 5,285,811 | 2/1994 | Diluigi et al. | 251/111 |
| 5,342,026 | 8/1994 | Dean | 251/85 |

FOREIGN PATENT DOCUMENTS

| | | | |
|---|---|---|---|
| 0 021 885 | 1/1981 | European Pat. Off. | 251/98 |
| 1198678 | 12/1959 | France | 251/294 |
| 2 258 136 | 6/1993 | Germany | 251/95 |

OTHER PUBLICATIONS

"Installation, Operating and Maintenance Instructions," Midland Bottom Outlet Valves, Midland Manufacturing Corporation, Oct. 31, 1987.

(List continued on next page.)

*Primary Examiner*—A. Michael Chambers
*Attorney, Agent, or Firm*—Akin, Gump, Strauss, Hauer & Feld, L.L.P.

[57] ABSTRACT

A valve assembly for a tank having an opening. The valve assembly includes a body assembly mounted to the tank opening. The body assembly has a valve seat and a valve throughbore. A valve disk coacts with the valve seat for opening and closing the valve throughbore. A locking lug is attached to the valve disk. The locking lug has a locking portion for receiving a safety lock pin mounted in the body assembly. The safety lock pin has a locked position and an unlocked position. The safety lock pin is received in the locking portion of the locking lug to lock the valve disk in the locked position, and the safety lock pin is withdrawn from the locking portion in the unlocked position. A valve operator is in releasable contact with the valve disk. The valve operator forces the valve disk away from the valve seat to open the valve throughbore. The body assembly includes a first member and a second member and the lock pin is mounted in the first member. A shear plane is formed between the first and second members such that the second member may be sheared from the first member at the shear plane without affecting the integrity of the lock pin in the locked position.

19 Claims, 4 Drawing Sheets

OTHER PUBLICATIONS

Lowell Corporation, "Ratchet Clutches," Thomas Register Catalog File, 6183, undated.

General American Transportation Corp., "6" Positive Internal Type Bottom Outlet Arrangement, Top Operated Internally Guided," undated, 1 page.

General American Transportation Corp., "6" Positive Integral Type, Jacketed, Bottom Outlet Arrangement, Top Operated Externally Guided," undated, 1 page.

INTERNAL TANK CAR VALVE WITH SAFETY LOCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates generally to internal valves for tanks, and more specifically refers to internal valves with locks for use in mobile tank cars.

2. Description of the Related Art

Tank valves are used for loading or unloading tanks, including railroad tank cars, truck tanks, stationary tanks, or other types of tanks used to contain liquids, gasses, or slurries. Applicant's U.S. Pat. No. 5,042,776 discloses an internal tank valve. The internal tank valve is positioned internally of the tank and is therefore less susceptible to damage, particularly in the event of a derailment or other accident involving a mobile tank. The internal tank valve disclosed in the '776 patent can be conveniently installed from the exterior of the tank, and easily removed for repair or replacement. The operator for the internal tank valve is also located internally of the tank.

Railroad tank cars and truck tanks are notoriously subjected to vibrations and shocks. Applicant's U.S. Pat. No. 5,145,151 discloses an internal tank valve with a valve lock to increase the safety factor of the valve. The internal tank valve of the '151 patent includes a primary seal which can be more securely locked in the closed position to assure a positive seal, a fire safe valve, and reduces the likelihood of spillage of material from inside of the tank in the event of a derailment or accident of the tank car. The locking structure is provided at a location that allows the valve to be held in a closed positive sealing position in the event of an accident in which part of the valve that protrudes and cap may be sheared off.

Applicant's U.S. Pat. No. 5,170,988 discloses an internal tank valve that is a cam actuated, quick acting, self-locking valve which reduces the possibility of the tank valve being opened due to shocks or vibration.

U.S. Pat. No. 5,342,026 discloses a valve having a cam actuator for opening and closing the valve. The cam actuator is directly coupled to a valve disk with a resilient coupling assembly.

It is desirable to have an internal tank valve with a safety lock that is simple, reliable, safe, and economical.

SUMMARY OF THE INVENTION

The present invention is an internal tank valve with a safety lock that is simple, reliable, safe, and economical.

The internal tank valve assembly is for a tank having an opening. The valve assembly includes a body assembly mounted to the tank opening. The body assembly has a valve seat and a valve throughbore. A valve disk coacts with the valve seat for opening and closing the valve throughbore. A locking lug is attached to the valve disk. The locking lug has a locking portion for receiving a safety lock pin mounted in the body assembly. The safety lock pin has a locked position and an unlocked position. The safety lock pin is received in the locking portion of the locking lug to lock the valve disk in the locked position, and the safety lock pin is withdrawn from the locking portion in the unlocked position. A valve operator is in releasable contact with the valve disk. The valve operator forces the valve disk away from the valve seat to open the valve throughbore.

The body assembly includes a first member and a second member. In one embodiment of the present invention, the lock pin is mounted in the first member and the valve operator is mounted in the second member. A shear plane is formed between the first and second members such that the second member and valve operator may be sheared from the first member at the shear plane without affecting the integrity of the lock pin in the locked position.

In a second embodiment of the present invention, the body assembly includes a first member and a second member and the lock pin is mounted in the first member. A shear plane is formed between the first and second members such that the second member may be sheared from the first member at the shear plane without affecting the integrity of the lock pin in the locked position.

BRIEF DESCRIPTION OF THE DRAWINGS

In order to more fully understand the drawings referred to in the detailed description of the present invention, a brief description of each drawing is presented, in which.

DETAILED DESCRIPTION OF INVENTION

Figure 1:
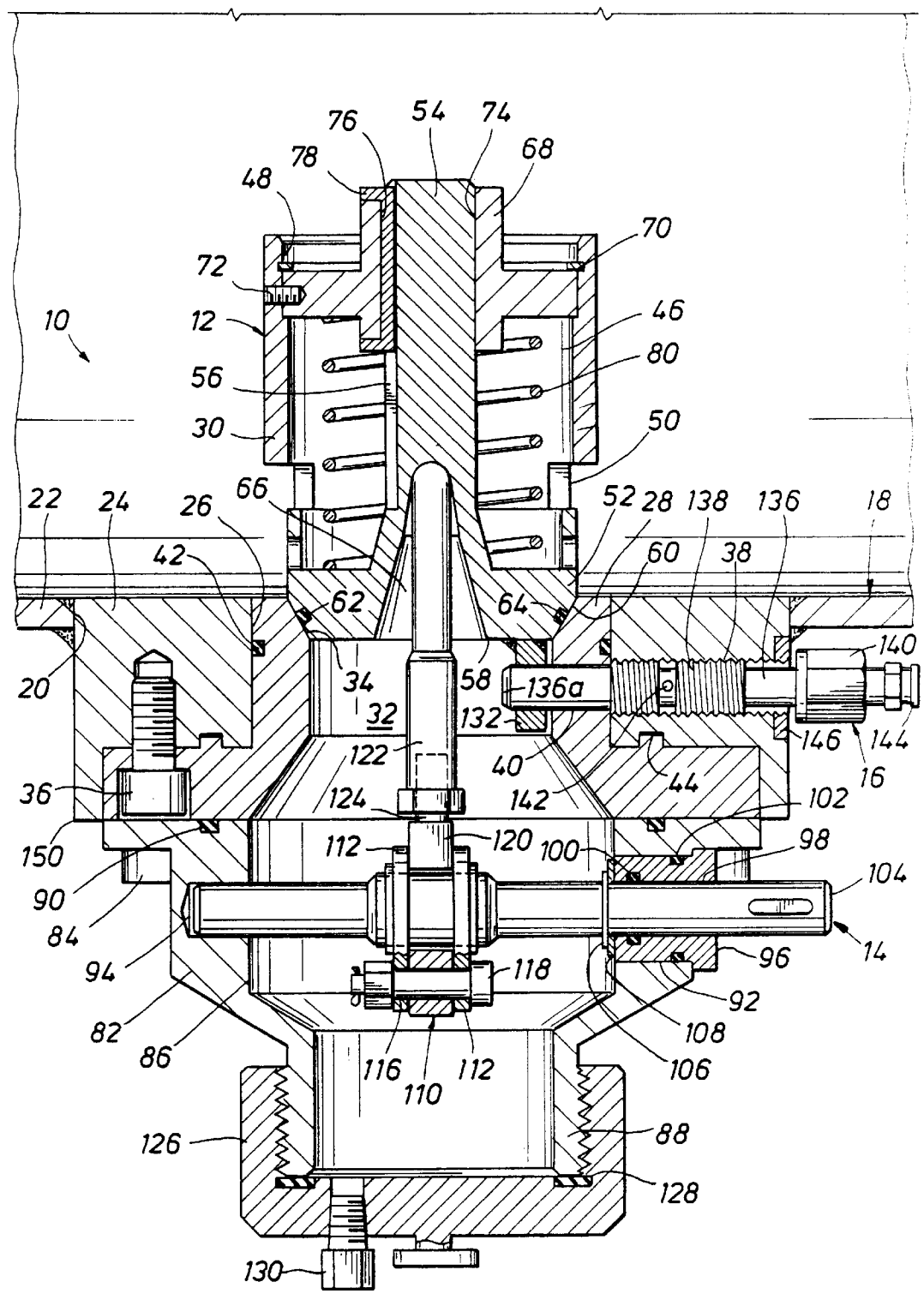
FIG. 1 is a sectional, elevational view of a first embodiment of the internal tank valve with safety lock, the internal tank valve with safety lock mounted in the bottom of a tank and having a lower valve operator, the internal tank valve with safety lock shown in a closed and locked position.
Figure 2:
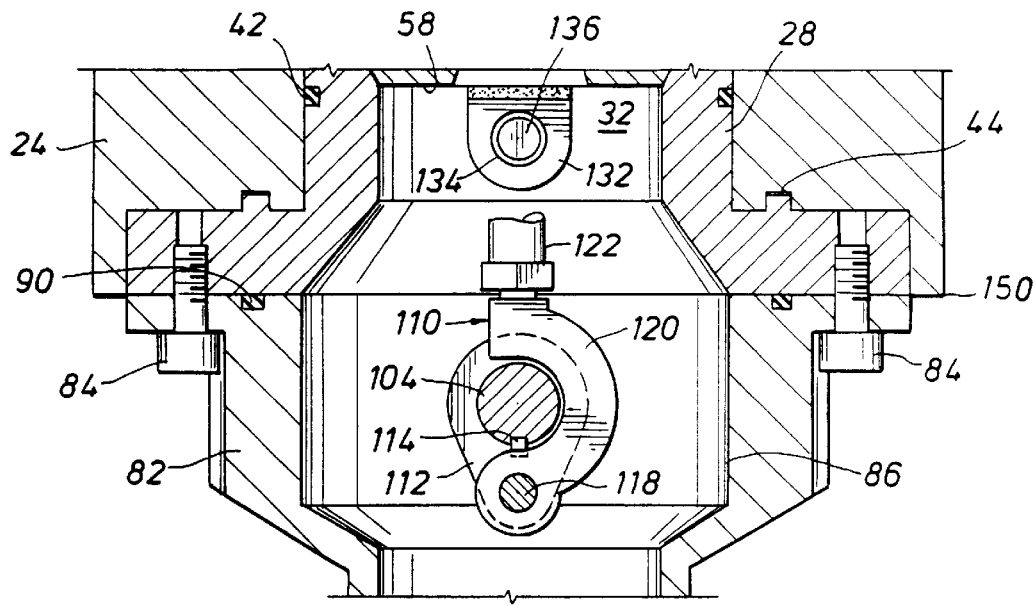
FIG. 2 is a side elevational view, in section, of the valve operator of FIG. 1 with the valve shown in the closed and locked position.
Figure 3:
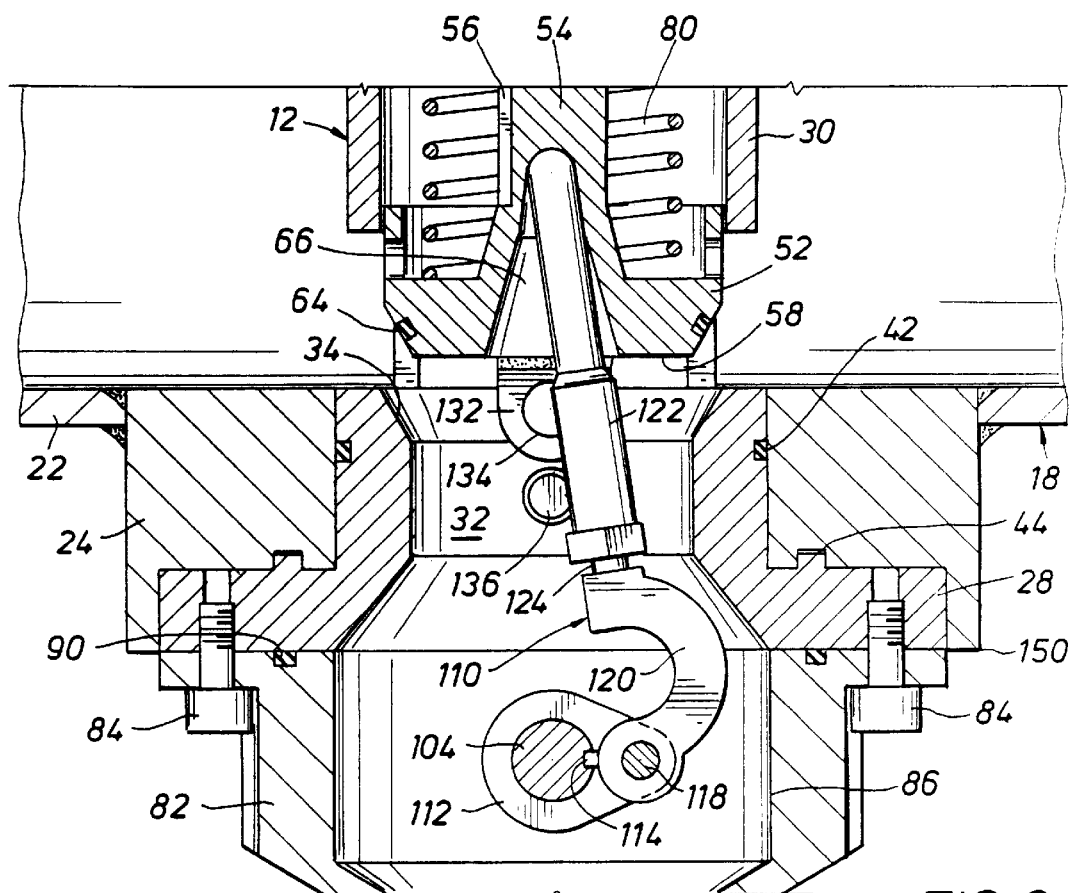
FIG. 3 is a partial side elevational view, in section, of the internal tank valve with safety lock of FIG. 1, the internal tank valve with safety lock in an open and unlocked position.
Figure 4:
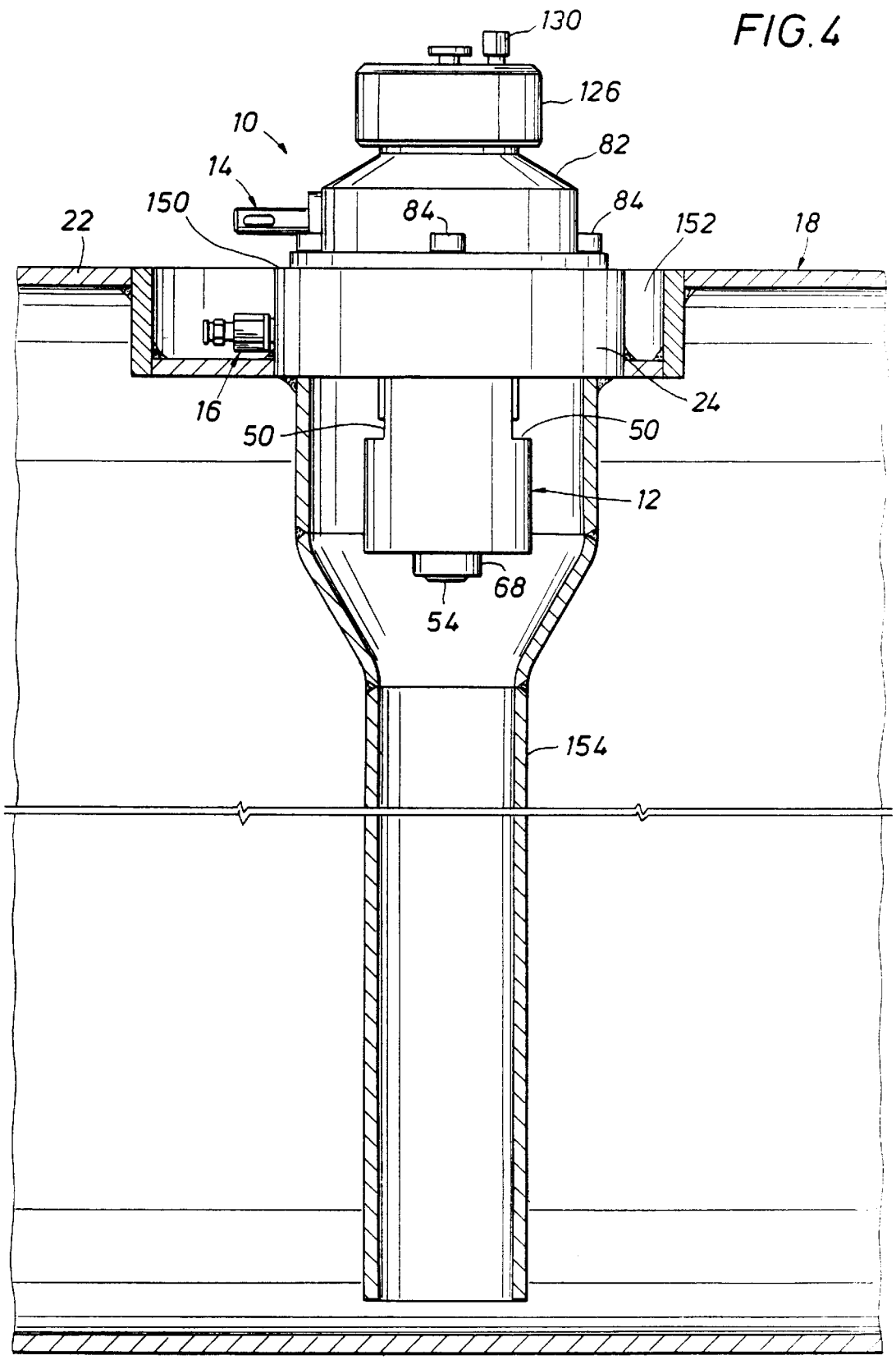
FIG. 4 is an elevational view of the internal tank valve with safety lock, the internal tank valve with safety lock mounted in the top of the tank and having an upper valve operator.

Referring now to the drawings in greater detail, the internal tank car valve with safety lock, or the tank valve assembly, is generally referred to as 10. FIGS. 1–3 show a first embodiment of the tank valve assembly 10 mounted in the bottom of a tank 18 and FIG. 4 shows the tank valve assembly 10 mounted in the top of the tank 18. It is to be understood that the top-mounted tank valve assembly 10 of FIG. 4 is identical to the bottom-mounted tank valve assembly 10 of FIGS. 1–3. The bottom-mounted tank valve assembly 10 of FIGS. 1–3 is inverted when installed as a top-mounted tank valve assembly 10 (FIG. 4).

The tank valve assembly 10 includes a main valve generally indicated as 12, a valve operator generally indicated as 14, and a safety lock generally indicated as 16. The feature of the safety lock 16 is operational in both the top-mount and bottom-mount tank valve assemblies 10 and may also be used with various types of valve operators 14 as shown in the drawings and described below. The main valve 12 is adapted to be installed inside of a mobile tank 18, as for example a railroad tank car. However, the internal tank car valve with safety lock 10 can be installed in other and various types of tanks.

The first embodiment of the tank valve assembly 10 will be described in detail with specific reference to FIGS. 1–3. Referring to FIG. 1, the internal tank car valve with safety lock 10 is shown as a bottom tank valve 12 having a bottom operator 14. A hole 20 is cut in a vessel wall 22 of the tank 18. A mounting adapter 24 is welded to the vessel wall 22. The mounting adapter 24 includes a valve body receiving bore 26 allowing insertion and removal of a valve body 28 and a guide tube 30. The valve body 28 includes a lading throughbore 32. The valve body 28 includes a valve seat 34 at one end of the lading throughbore 32. Preferably, the valve body 28 is secured to the mounting adapter 24 with a plurality of threaded fasteners 36. The mounting adapter 24 includes a radial bore 38 extending from the outer surface of the mounting adapter 24 to the valve body receiving bore 26. The valve body 28 also includes a radial bore 40 adjacent and in axial alignment with the radial bore 38. Preferably, an O-ring seal 42 and a sealing gasket 44 are provided above and below the radial bores 38 and 40 forming seals between the valve body 28 and the mounting adapter 24 as shown in FIGS. 1–3.

Referring to FIG. 1, the guide tube 30 is connected, preferably by welding, to the valve body 28. The guide tube 30 includes a longitudinal bore 46 having a slightly enlarged diameter upper bore portion 48. The lower portion of the guide tube 30 includes a plurality of windows 50 through the wall of the guide tube 30.

A valve disk 52 includes an upper post 54, preferably cylindrical and including a longitudinal keyway 56. The valve disk 52 includes a lower face 58 intersecting with an outwardly tapering seal face 60. The seal face 60 preferably includes a seal ring groove 62 for receiving a seal ring 64. In the first embodiment of the present invention, the valve disk 52 includes a blind bore 66, preferably inwardly tapered, in the lower face 58 as shown in FIGS. 1 and 3.

It is to be understood that the seal face 60 with the seal ring 64 corresponds to and abuts with the valve seat 34 of the valve body 28 when the main valve 12 is in the closed position. Alternatively, the seal ring groove 62 and seal ring 64 could be located in the valve seat 34 instead of the seal face 60.

Referring to FIG. 1, a guide body 68 has an outer diameter adapted to be received in the upper bore portion 48 of the guide tube 30. Preferably, a snap ring 70 secures the axial location of the guide body 68 relative to the guide tube 30. Preferably, the guide body 68 is prevented from rotating relative to the guide tube 30. One such means for accomplishing this is shown in FIG. 1 by fixing the angular orientation of the guide body 68 with a pin 72 extending through the wall of the guide tube 30 and into the guide body 68. The guide body 68 includes a central bore 74 having a longitudinal recess 76 for partially receiving an anti-rotation key 78. The anti-rotation key 78 is also partially received in the longitudinal keyway 56 in the upper post 54 of the valve disk 52. It is to be understood that the valve disk 52 is prevented from rotating relative to the valve body 28. A compression spring 80 is positioned around the upper post 54 and between the lower portion of the valve disk 52 and the guide body 68. The spring 80 applies a force to seat the valve disk 52 with the valve body 28 as shown in FIG. 1.

Referring to FIGS. 1–3, the valve operator 14 is mounted in a base member 82. Preferably, the base member 82 is secured to the valve body 28 with a plurality of threaded fasteners 84 as shown in FIGS. 2 and 3. The base member 82 includes a lading passageway 86 and a lading outlet 88. Preferably, an O-ring seal 90 is located around the lading passageway 86 and between the base member 82 and the valve body 28. Referring to FIG. 1, the base member 82 includes a radial throughbore 92 and a radial operator blind bore 94. The radial throughbore 92 and the radial operator blind bore 94 are axially aligned on opposite sides of the lading passageway 86. A sealing cartridge 96 having a radial operator throughbore 98 is received in the radial throughbore 92. The sealing cartridge 96 includes an inner O-ring seal 100 and an outer O-ring seal 102. The outer O-ring seal 102 seals with the radial throughbore 92 of the base member 82. The inner O-ring seal 100 seals with an operator shaft 104. As shown in FIG. 1, the operator shaft 104 extends through the sealing cartridge 96 and into the radial operator blind bore 94. Although not shown in the drawings, it is to be understood that the sealing cartridge 96 is secured to the base member 82 preferably with threaded fasteners. Preferably, the operator shaft 104 includes a snap ring 106 and washer 108 that serve to maintain the operator shaft 104 within the base member 82 as shown in FIG. 1.

An operator linkage assembly 110 is connected to the operator shaft 104. Referring to FIGS. 1–3, a pair of crank links 112 are secured to the operator shaft 104, preferably with a key 114 (FIGS. 2 and 3). The crank links 112 include a hole 116 for receiving a pin 118. A curved actuating link 120 is pivotally connected to the crank links 112 with the pin 118. A valve actuating pin 122 is connected to the curved actuating link 120. Preferably, the valve actuating pin 122 is connected to the curved actuating link 120 with a threaded stud 124. As shown in FIGS. 1 and 3, the valve actuating pin 122 extends into the inwardly tapered blind bore 66 of the valve disk 52.

Referring to FIG. 1, a shipping cap 126 is threadedly fastened to the lading outlet 88 of the base member 82. Preferably, a sealing gasket 128 is positioned within the shipping cap 126 to form a seal between the base member 82 and the shipping cap 126. Preferably, the shipping cap 126 includes a "tell tale" tap 130 that is threaded into the shipping cap 126. The tap 130 allows one to remove the tap 130 and check for any leakage past the valve disk 52 before removing the shipping cap 126.

Referring to FIGS. 1–3, a locking lug 132 is secured, preferably by welding, to the lower face 58 of the valve disk 52. The locking lug 132 includes a locking bore 134 for receiving a safety lock pin 136. Preferably, the locking bore 134 is a rounded hole slightly elongated along a horizontal axis. The slight horizontal elongation of the locking bore 134 accommodates slight rotation of the valve disk 52 resulting from the key and keyway connection 78, 56 of the valve disk 52 to the guide body 68. It is to be understood that the locking lug 132 can be an elongated sleeve or member having a locking bore 134 therein for receiving the safety lock pin 136. Alternatively, the locking lug 132 may have a locking slot or receiving portion for receiving the safety lock pin 136.

Referring to FIG. 1, the safety lock pin 136 preferably includes a threaded portion 138 that threadedly engages the radial bore 38 of the mounting adaptor 24. The safety lock pin 136 includes an exterior head 140 to rotate the safety lock pin 136 to advance or retract the pin 136 relative to the locking lug 132 as will be explained below. The safety lock pin 136 preferably includes a beveled end 136a to facilitate the insertion of the pin 136 into the locking bore 134 of the locking lug 132. Preferably, the safety lock pin 136 includes a sealant groove 142 extending longitudinally through the safety lock pin 136 from the head 140 to approximately the center of the threaded portion 138 where it exits the pin 136 as shown in FIG. 1. A sealant fitting 144 connected to the pin head 140 allows a sealant to be injected into the sealant groove 142 with a sealant gun or wrench (not shown) to seal the threaded bore 38 of the mounting adaptor 24 when in the locked position as shown in FIG. 1. A lock plate 146 is secured, preferably with threaded fasteners (not shown) to the exterior of the mounting adaptor 24. The lock plate 146 provides a stop to prevent the safety lock pin 136 from being removed from the mounting adaptor 24.

The operation of the internal tank car valve with safety lock 10 will now be described with specific reference to FIGS. 1–3. FIGS. 1 and 2 show the tank valve assembly 10 in the closed and locked position. The tank valve assembly 10 is closed rotating the operator shaft 104 to bring the curved actuating link 120 of the operator linkage assembly 110 in close relationship to the operator shaft as shown in FIGS. 1 and 2. In the closed position the valve actuating pin 122 is retracted so as not to exert any axial force on the valve disk 52. The compression spring 80 exerts an axial force against the valve disk 52 causing the seal face 60 to seal with the valve seat 34 and close the main valve 12. With the main valve 12 in the closed position, the safety lock pin 136 is threadedly advanced in the radial bore 38 of the mounting adaptor 24 so that the safety lock pin 136 extends through the locking bore 134 of the locking lug 132 to lock the main valve 12 in the closed position. In the locked position, sealant may be injected through the sealant groove 142 of the safety lock pin 136 to further ensure against leakage.

It is to be understood that the tank valve assembly 10 includes a shear plane 150 at the junction of the base member 82 to the valve body 28. Thus, in the case of an accident or derailment, the tank valve assembly 10 can have the base member 82 with the valve operator 14 sheared off without affecting the integrity of the safety lock 16 and its retention of the main valve 12 in the closed and locked position. Since the valve operator actuating pin 122 is not attached to the valve disk 52, the valve operator 14 is free to separate from the valve disk 52 without affecting the seal between the valve disk 52 and the valve seat 34.

The tank valve assembly 10 is unlocked by rotating the safety lock pin 136 to retract the safety lock pin 136 from the locking bore 134 of the locking lug 132. With the shipping cap 126 removed from the lading outlet 88 of the base member 82, the operator shaft 104 is rotated to cause the valve actuating pin 122 to unseat the valve disk 52 from the valve seat 34 by compressing the compression spring 80. The lading flows through the windows 50 in the guide tube 30 and between the valve disk 52 and the valve seat 34. The lading continues to flow through the lading throughbore 32, the lading passageway 86, and the lading outlet 88.

Referring to FIG. 4, the tank valve assembly 10 is shown mounted in the top of the tank 18. Although not required, it may be desirable to mount the tank valve assembly 10 in an upper tank recess 152 so as to lower the shear plane 150 to the approximate level of the vessel wall 22. The top-mounted tank valve assembly 10 requires the use of a dip tube 154 that is mounted to the mounting adaptor, preferably by welding. The dip tube 154 extends substantially to the bottom of the tank 18. Although not shown, typically there is one or more top-mounted valves used in conjunction with the tank valve assembly 10. These other top-mounted valves are used to pressurize the top of the tank 18 and force the lading up and through the dip tube 154 and through the top-mounted tank valve assembly 10 when the valve assembly 10 is in the open position. The top-mounted tank valve assembly 10 operates in the same manner as the bottom-mounted tank valve assembly 10 described above.

Figure 5:
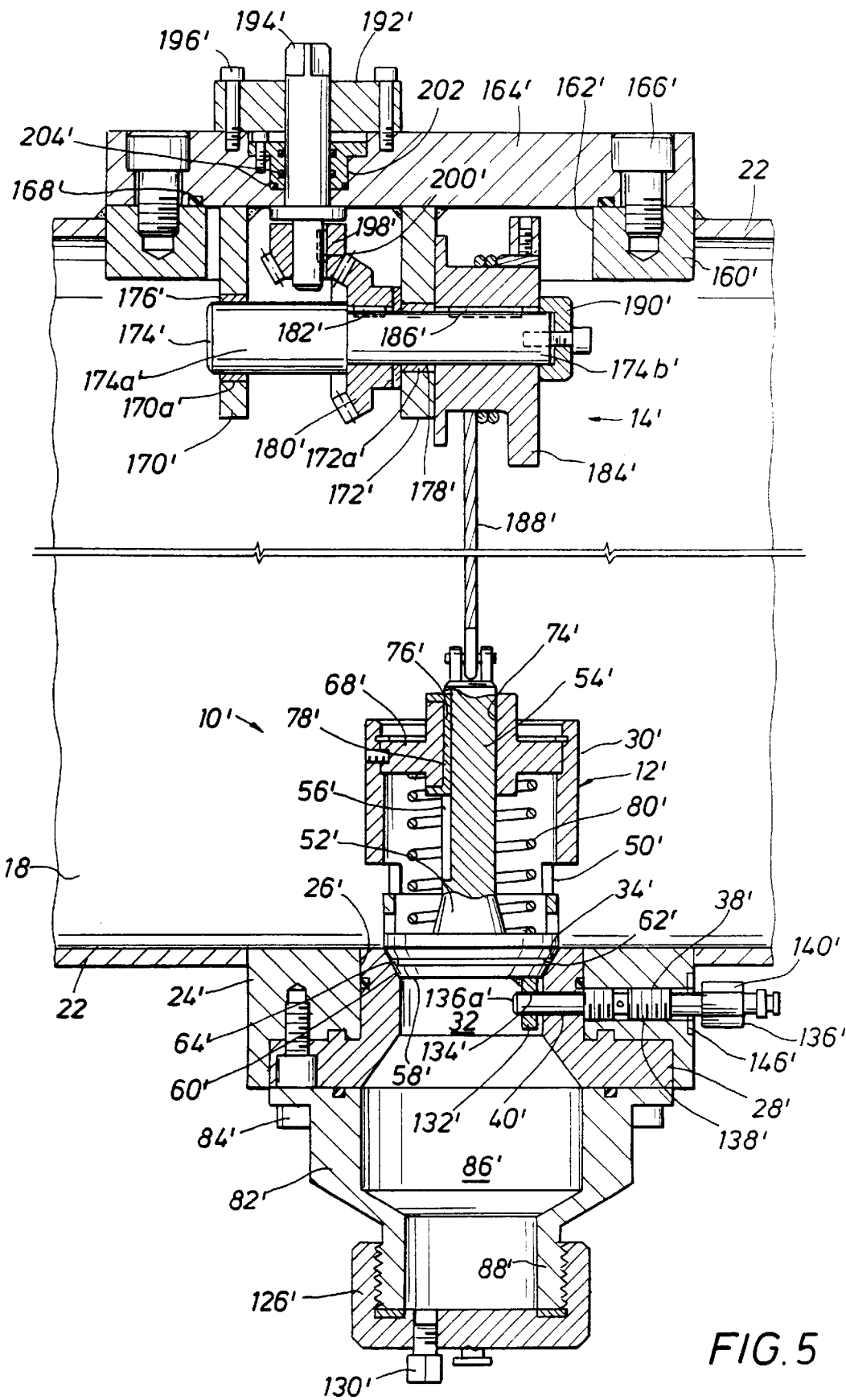
FIG. 5 is a sectional, elevational view of a second embodiment of the internal tank valve with safety lock, the internal tank valve with safety lock mounted in the bottom of the tank and having a top cable valve operator.

Referring to FIG. 5, a second embodiment of the tank valve assembly, generally referred to as 10', is shown mounted in the bottom of the tank 18 and having a top cable valve operator 14'.

The tank valve assembly 10' is similar in most respects to the tank valve assembly 10 with the exception of the valve operator 14'. Thus, unless certain components are specifically identified and described differently than for the first embodiment, they are presumed to be the same. Referring to FIG. 5, a mounting adapter 24' is welded to the vessel wall 22. The mounting adapter 24' includes a valve body receiving bore 26' allowing insertion and removal of a valve body 28' and a guide tube 30'. The valve body 28' includes a lading throughbore 32'. The valve body 28' includes a valve seat 34' at one end of the lading throughbore 32'. The mounting adapter 24' includes a radial bore 38' extending from the outer surface of the mounting adapter 24' to the valve body receiving bore 26'. The valve body 28' also includes a radial bore 40' adjacent and in axial alignment with the radial bore 38'.

Still referring to FIG. 5, the guide tube 30' is connected, preferably by welding, to the valve body 28'. The lower portion of the guide tube 30' includes a plurality of windows 50' through the wall of the guide tube 30'.

A valve disk 52' includes an upper post 54', preferably cylindrical and including a longitudinal keyway 56'. The valve disk 52' includes a lower face 58' intersecting with an outwardly tapering seal face 60'. The seal face 60' preferably includes a seal ring groove 62' for receiving a seal ring 64'. Alternatively, the seal ring groove 62' and seal ring 64' could be located in the valve seat 34' instead of the seal face 60'.

Still referring to FIG. 5, a guide body 68' has an outer diameter adapted to be received and secured in the guide tube 30'. The guide body 68' includes a central bore 74' having a longitudinal recess 76' for partially receiving an anti-rotation key 78'. The anti-rotation key 78' is also partially received in the longitudinal keyway 56' in the upper post 54' of the valve disk 52'. It is to be understood that the valve disk 52' is prevented from rotating relative to the valve body 28' and the guide body 68' is prevented from rotating relative to the guide tube 30'. A compression spring 80' is positioned around the upper post 54' and between the lower portion of the valve disk 52' and the guide body 68'. The spring 80' applies a spring force to seat the valve disk 52' with the valve body 28' as shown in FIG. 5.

The base member 82' is secured to the valve body 28' with a plurality of threaded fasteners 84' as shown in FIG. 5. The base member 82' includes a lading passageway 86' and a lading outlet 88'. A shipping cap 126' is threadedly fastened to the lading outlet 88' of the base member 82'. Preferably, the shipping cap 126' includes a "tell tale" tap 130' that is threaded into the shipping cap 126'.

Still referring to FIG. 5, a locking lug 132' is secured, preferably by welding, to the lower face 58' of the valve disk 52'. The locking lug 132' includes a locking bore 134' for receiving a safety lock pin 136'. It is to be understood that the locking lug 132' can be an elongated sleeve or member having a locking bore 134' therein for receiving the safety lock pin 136'. Alternatively, the locking lug 132' may have a locking slot or receiving portion for receiving the safety lock pin 136'. It is also to be understood that the locking lug 132' may be attached to the lower face 58' of the valve disk 52' at other locations on lower face 58' in axial alignment with the safety lock pin 136'. For example, it may be desirable to attach the locking lug 132' to the center of the lower face 58' of the valve disk 52'. Irrespective of the location of the locking lug 132' on the valve disk 52', the safety lock pin 136' must be retractable to withdraw from the locking bore 134' in the unlocked position.

The safety lock pin 136' preferably includes a threaded portion 138' that threadedly engages the radial bore 38' of the mounting adaptor 24'. The safety lock pin 136' includes an exterior head 140' to rotate the safety lock pin 136' to advance or retract the pin 136' relative to the locking lug 132'. The safety lock pin 136' preferably includes a beveled end 136a' to facilitate the insertion of the pin 136' into the locking bore 134' of the locking lug 132'. A lock plate 146' is secured, preferably with threaded fasteners (not shown) to the exterior of the mounting adaptor 24'.

A mounting flange 160' of the valve operator 14' is mounted to the wall 22 at the top of the tank 18. The mounting flange 160' includes a bore 162' therethrough. A mounting plate 164' is secured to the mounting flange 160', preferably with threaded fasteners 166'. Preferably, a seal ring 168' is positioned between the mounting flange 160' and the mounting plate 164' to provide a seal therebetween. First and second support plates 170' and 172', respectively, are secured to the lower face of the mounting plate 164'. The first and second support plates 170' and 172' include shaft bores 170a' and 172a', respectively, for receiving a shaft 174'. The shaft 174' includes a first shaft portion 174a' which is received in the first support plate shaft bore 170a'. The shaft 174' includes a second shaft portion 174b' which is received in the second support plate shaft bore 172a'. As shown in FIG. 5, preferably bushings or bearings 176' and 178' are positioned between the shaft 174' and the shaft bores 170a' and 172a', respectively. A first bevel gear 180' is connected to the shaft 174'. Preferably, the first bevel gear 180' is connected to the shaft 174' with a key 182'. A cable drum 184' is also mounted to the shaft 174' with a key 186'. A valve operating cable 188' is connected to the cable drum 184' and to the upper end of the valve disk upper post 54'. A cap 190' is attached to an end of the shaft 174' to secure the shaft 174', the first bevel gear 180' and the cable drum 184' in place. A ratchet clutch 192' is mounted, preferably with threaded fasteners 196', to the upper face of the mounting plate 164'. Ratchet clutches 192' having gears, pawls and springs (not shown) are commercially available from various companies, including Lowell Corporation of Worcester, Mass. A ratchet clutch shaft 194' extends through the mounting plate 164' and has a second bevel gear 198' mounted thereon, preferably with a key 200'. Preferably, a seal cartridge 202' with a plurality of seals 204' ensures a seal between the mounting plate 164' and the ratchet clutch shaft 194'.

It is to be understood that in this embodiment of the invention as shown in FIG. 5, the tank valve assembly 10' will be used to unload the lading from the bottom of the tank 18, but the cable valve operator 14' is installed on top of the tank 18. Preferably, the only time tension is in the cable 188' is when the tank valve assembly 10' is open by operating the ratchet clutch 192' to reel cable 188' onto the cable drum 184', thus raising the valve disk 52'. The tank valve assembly 10' is closed by reeling cable 188' off of the cable drum 184' and allowing the compression spring 80' to force the valve disk 52' to the closed position. Preferably, a slack of approximately three or more inches in the cable 188' should be provided in the closed position to allow for flexing of the tank 18 or movement of the lading inside the tank 18. Although not shown in the FIG. 5, preferably a positive rotation stop system is incorporated in the valve operator 14'. For example, a stop system can be incorporated with the cable drum 184' or the ratchet clutch 192' to provide a stop at the fully open and closed positions of the main valve 12'. It is to be understood that a $\frac{1}{4}^{th}$ inch, 7–19 stainless cable 188' has a breaking strength of 6,400 pounds and is suitable for use in the present invention.

It is contemplated that the safety lock pin 136, 136' could include other designs than the design shown in the drawings. The main requirement is that the safety lock pin 136, 136' prevent inadvertent unseating of the valve disk 52, 52' from the valve seat 34, 34'. Thus, the safety lock pin 136, 136' may include threads requiring rotation to advance or retract the pin from the locking lug 132, 132' or may be a smooth shaft which is pushed and pulled. Additionally, it is to be understood that the safety lock pin 136, 136' may include various types of sealing configurations using seals, as for example O-rings, to prevent the escape of lading through the radial bores 38, 38', 40, 40'.

While not shown in the drawings, it is to be understood that two or more safety locks 16 could be used with the tank valve assembly 10, 10' of the present invention.

The foregoing disclosure and description of the invention are illustrative and explanatory thereof, and various changes in the details of the illustrated apparatus and construction and method of operation may be made without departing from the spirit of the invention.

I claim:

1. A valve assembly for a tank having an opening, the valve assembly comprising:

a body assembly mounted to the tank opening, said body assembly having a valve seat and a valve throughbore;

a valve disk coacting with said valve seat for opening and closing said valve throughbore;

a locking lug attached to said valve disk, said locking lug having a locking bore;

a lock pin mounted in said body assembly, said lock pin having a locked position preventing opening of said valve throughbore and an unlocked position, said lock pin being received in said locking bore to lock said valve disk in the locked position, and said lock pin being withdrawn from said locking bore in the unlocked position.

2. The valve assembly of claim 1, further comprising a valve operator in contact with said valve disk, said valve operator capable of forcing said valve disk away from said valve seat to open said valve throughbore when said lock pin is in the unlocked position.

3. The valve assembly of claim 2, wherein said valve operator releasably contacts said valve disk.

4. The valve assembly of claim 3, wherein said body assembly includes a first member and a second member, said lock pin mounted in said first member and said valve operator mounted in said second member, a shear plane formed between said first and second members, wherein said second member and said valve operator may be sheared from said first member at said shear plane without affecting the integrity of said lock pin in the locked position.

5. The valve assembly of claim 4, wherein the tank has a tank recess and said first member is within the tank recess.

6. The valve assembly of claim 2, wherein said body assembly includes a first member and a second member, said lock pin mounted in said first member, a shear plane formed between said first and second members, wherein said second member may be sheared from said first member at said shear plane without affecting the integrity of said lock pin in the locked position.

7. The valve assembly of claim 6, wherein said valve operator further comprises:
   a rotatable drum; and
   a cable having a first end and a second end, said first end attached to said drum and a second end attached to said valve disk.

8. The valve assembly of claim 7, wherein said valve operator further comprises a ratchet clutch for controlling the rotation of said drum.

9. The valve assembly of claim 1, wherein said lock pin includes a threaded portion which engages a threaded bore in said body assembly.

10. The valve assembly of claim 1, wherein said lock pin engages a radial bore in said body assembly and said lock pin includes a sealant groove in communication with said radial bore allowing a sealant to be injected through said sealant groove into said radial bore.

11. A valve assembly for a vessel having an opening, the valve assembly comprising:
   a body assembly mounted to the vessel opening, said body assembly having a valve seat and a valve throughbore;
   a valve disk coacting with said valve seat for opening and closing said valve throughbore;
   a receiver member extending from said valve disk, said receiver member having a receiver portion; and
   a lock member mounted in said body assembly, said lock member capable of being received in said receiver portion to lock said valve disk in a locked position restricting movement of said valve disk relative to said valve seat.

12. The valve assembly of claim 11, wherein said lock member is capable of being withdrawn from said receiver portion to unlock said valve disk.

13. The valve assembly of claim 11, wherein said lock member includes a threaded portion which engages a threaded bore in said body assembly.

14. The valve assembly of claim 11, further comprising a valve operator in contacting relationship with said valve disk, said valve operator capable of forcing said valve disk away from said valve seat to open said valve throughbore.

15. The valve assembly of claim 14, wherein said valve operator releasably engages said valve disk.

16. The valve assembly of claim 14, wherein said valve operator is controlled independently of said lock member.

17. The valve assembly of claim 14, wherein said valve operator further comprises:
   a rotatable drum; and
   a cable having a first end and a second end, said first end attached to said drum and a second end attached to said valve disk.

18. The valve assembly of claim 17, wherein said valve operator further comprises a ratchet clutch for controlling the rotation of said drum.

19. The valve assembly of claim 18, further comprising:
   a guide tube maintaining the axial alignment of said valve disk with said valve seat; and
   a compression spring capable of forcing said valve disk into sealing contact with said valve seat.

* * * * *